United States Patent [19]

Berkowitch

[11] 3,740,940
[45] June 26, 1973

[54] PLEXIFILIMENTARY CELLULOSE STRAND
[75] Inventor: John Emmanuel Berkowitch, Wilmington, Del.
[73] Assignee: E. I. du Pont de Nemours and Company, Wilmington, Del.
[22] Filed: Oct. 26, 1971
[21] Appl. No.: 192,194

[52] U.S. Cl.............. 57/140 R, 28/DIG. 1, 57/155, 161/169, 264/DIG. 8
[51] Int. Cl............................................. D02g 3/02
[58] Field of Search................. 28/DIG. 1; 57/140 R, 57/155, 140 J, 167, 157 R; 264/DIG. 8, DIG. 47, 53, 205; 161/168, 169

[56] References Cited
UNITED STATES PATENTS
| 2,372,695 | 4/1945 | Taylor.................... 264/53 |
| 2,815,559 | 12/1957 | Robinson.......................... 28/DIG. 1 |
| 3,081,519 | 3/1963 | Blades et al. .................... 28/DIG. 1 |
| 3,227,784 | 1/1966 | Blades et al. ........................ 264/53 |
| 3,227,794 | 1/1966 | Anderson et al. .................. 264/205 |
| 3,290,207 | 12/1966 | Magat et al...................... 28/DIG. 1 |

Primary Examiner—John Petrakes
Attorney—Gary A. Samuels

[57] ABSTRACT

Textile products are disclosed comprising an assembly of fibrils in the form of a plexifilament, yarn, fabric or the like. The fibrils are of irregular cross-section and are composed of regenerated cellulose or cellulose acetate having a degree of substitution of between about 2.0 and 2.6. Most fibrils are interconnected to form a plexus. The products are stable to repeated water exposure and have a specific surface of at least about 0.4 square meter per gram and a fibril concentration of at least about $50 \times 10^3$ per square centimeter. The products have a water absorption rate of greater than about 0.1 milliliter per second and are useful in textile applications, particularly where good, stable water-absorption characteristics are desirable.

6 Claims, 5 Drawing Figures

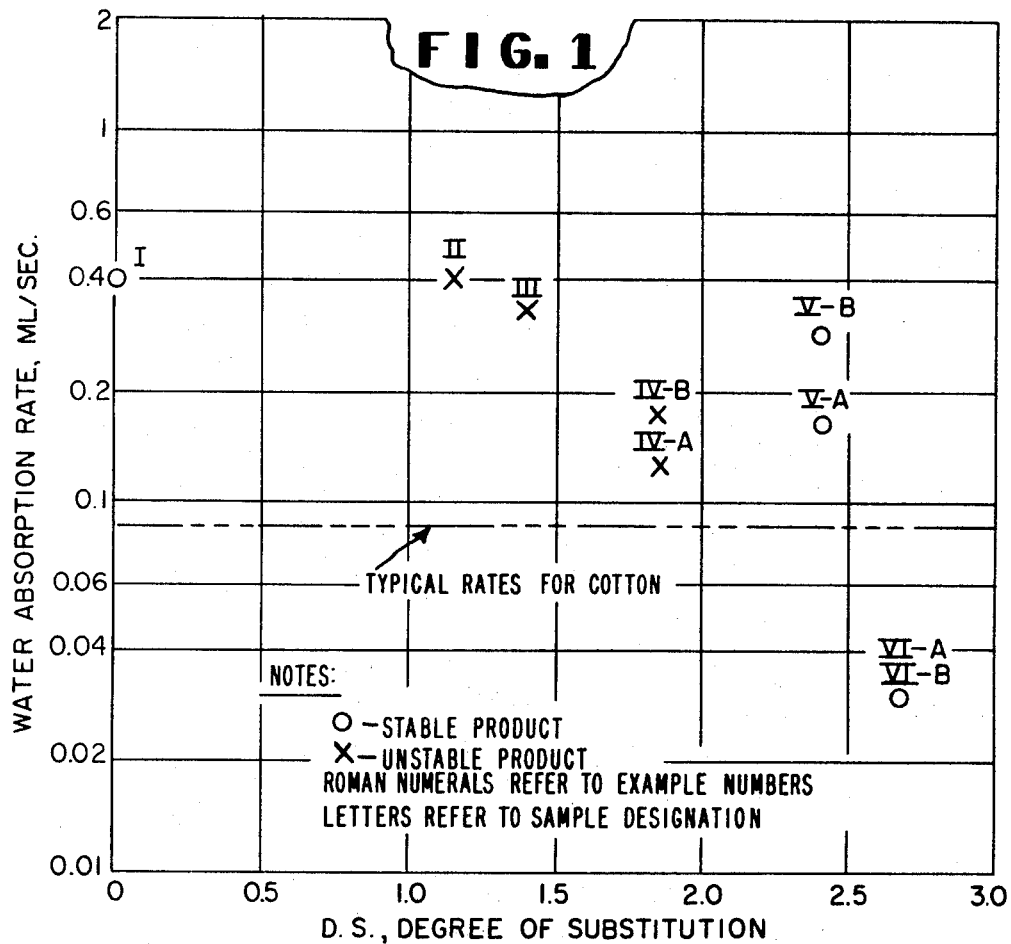
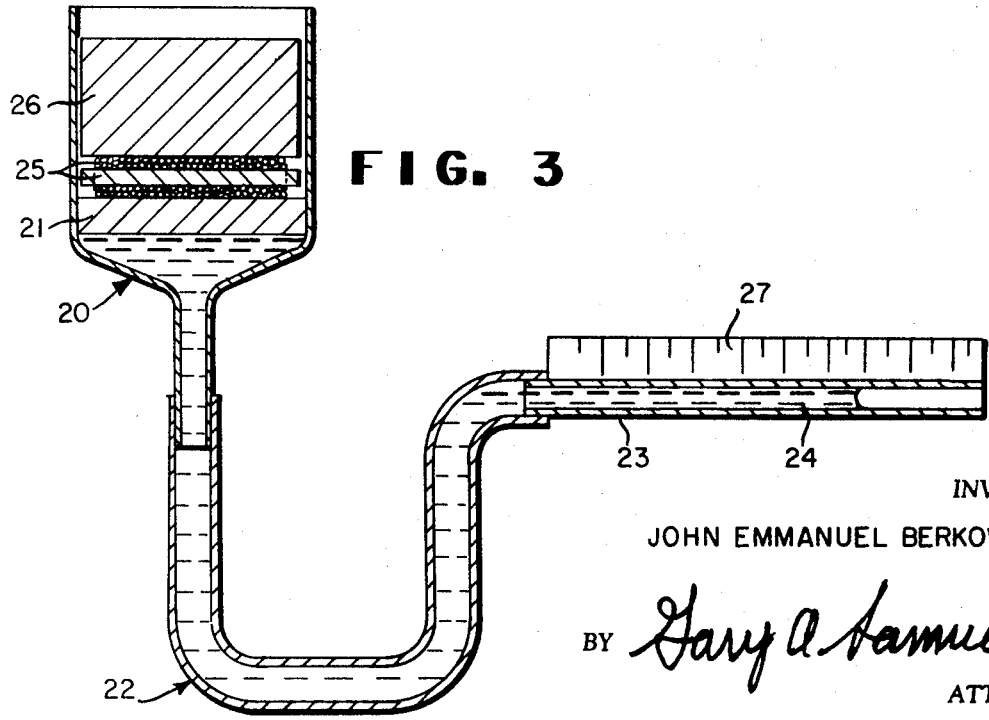
INVENTOR
JOHN EMMANUEL BERKOWITCH
BY *Gary A. Samuels*
ATTORNEY PATENTED JUN 26 1973 3,740,940
SHEET 2 OF 2
FIG. 4
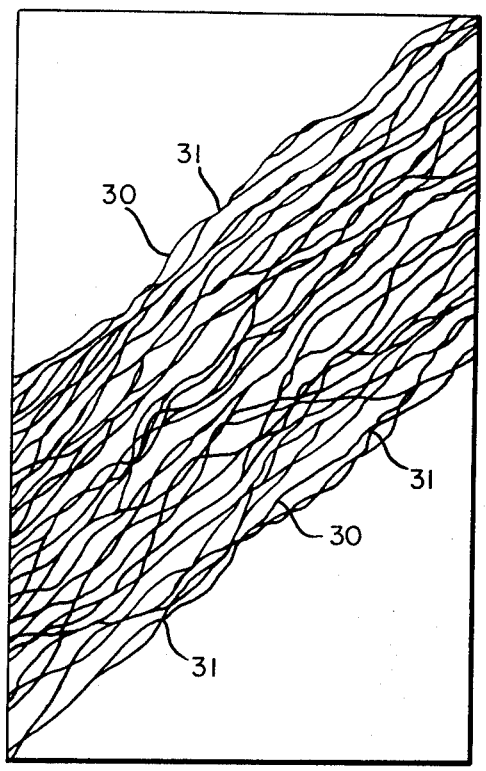
FIG. 2
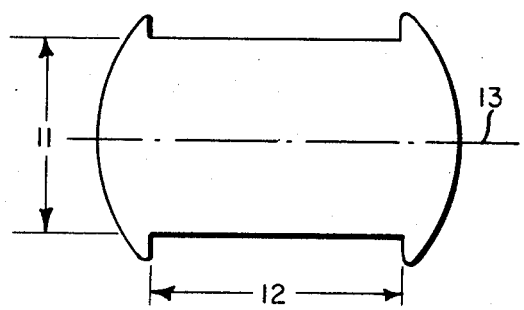
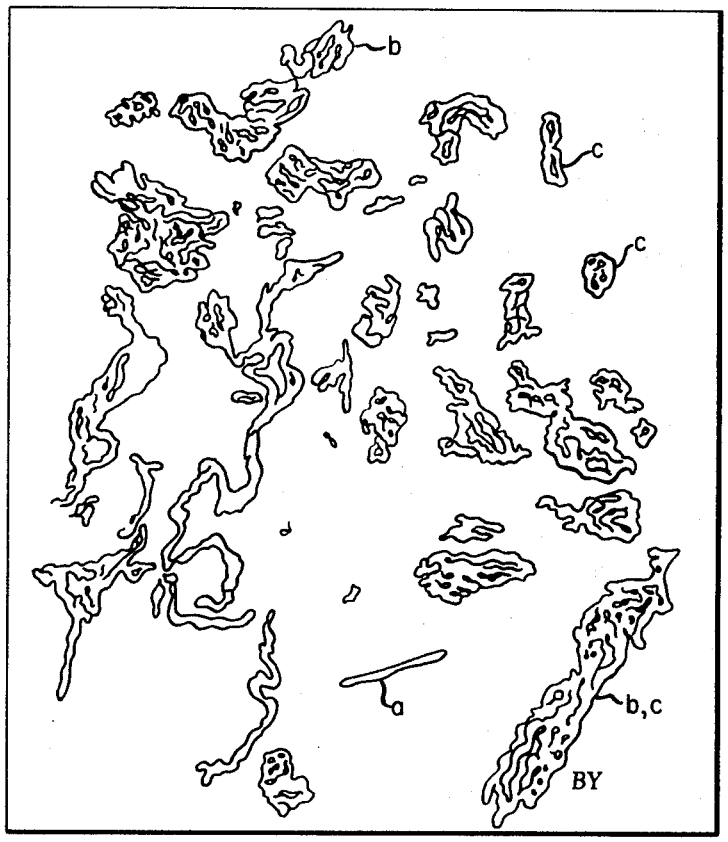
FIG. 5
INVENTOR
JOHN EMMANUEL BERKOWITCH
BY Gary A. Samuels
ATTORNEY

PLEXIFILIMENTARY CELLULOSE STRAND

BACKGROUND OF THE INVENTION

1. Field of the Invention

This invention relates to textile products made from assemblies of cellulosic fibrils. More particularly, the invention is directed to plexifilamentary assemblies of fibrils of regenerated cellulose or cellulose acetate having a specific degree of substitution.

2. Description of Prior Art

Several types of textile products containing noncellulosic fibrils are known in the prior art. Some are produced by mechanically working or "fibrillating" sheets, bands, films, foils, ribbons or filaments of highly oriented synthetic organic polymers. Others are produced by melt extruding blends of two or more incompatible polymers into filaments or sheets, followed by drawing the extrudate and then either mechanically working to cause fibrillation or extracting or dissolving one of the polymers to leave a coarsely fibrillated product. Other such fibrillated products are prepared by stretching or mechanically working foamed polymeric sheets or filaments. Still other fibrillated products, such as plexifilamentary strands, are produced by flash extruding a solution of a crystalline synthetic organic polymer in an activating liquid under superatmospheric pressure and at a temperature in excess of the boiling point of the activating liquid into a region of lower pressure.

None of the above-described prior art products possess all the structural features that provide the stable water-absorption characteristics of the products of this invention.

SUMMARY OF THE INVENTION

This invention is directed to a textile product comprising an assembly of fibrils. The assembly is of at least staple fiber length. The fibrils are of irregular cross-section and are composed of regenerated cellulose or cellulose acetate having a degree of substitution (D.S.) of between about 2.0 and about 2.6. A majority of the fibrils are interconnected at various points to form a plexus. The product has a specific surface (S) of at least about 0.4 square meter per gram and a fibril concentration (F) of at least about $50 \times 10^3$ per square centimeter. Values of S of at least 1.5 and of F of at least $250 \times 10^3$ are preferred. These products are stable to repeated exposure to water, have high surface area, high covering power and absorb water as well as, or even better, than cotton, as indicated by their water absorption rates of at least about 0.1 milliliter per second. Because of the fewer process steps needed compared to alternative processes, and because of better control of product quality, it is preferred to obtain the product of this invention in the form of continuous plexifilamentary strands.

DESCRIPTION OF THE DRAWINGS

The invention may be more easily understood by reference to the figures where:

FIG. 1 is a graph illustrating the relationship between the water-absorption rate and the degree of substitution (D.S.) for assemblies of fibrils within the scope, as well as outside the scope of this invention;

FIG. 2 is a top view of a sample holder employed with the apparatus of FIG. 3;

FIG. 3 is a cross-section of an apparatus for determining liquid-absorption rates of textile products;

FIG. 4 is a drawing of a magnified longitudinal section of an assembly of fibrils of a textile product within the scope of this invention; and FIG. 5 is a drawing of an enlarged cross-section of an assembly of fibrils that is representative of a textile product within the scope of this invention.

DESCRIPTION OF THE INVENTION

It has been found that when textile products of fibril assemblies of regenerated cellulose or cellulose acetate having a D.S. of between about 2.0 and 2.6 have the specific surface area and fibril concentration recited above, the products are stable to repeated exposure to water and absorb water at rates equal to or above those typical of cotton. When the D.S. is in the above-specified range, the polymer is stable to repeated exposure to water and when incorporated into textile products meeting the other structural features of this invention, the products absorb water at rates in excess of 0.1 ml./sec. In general, plexifilamentary yarns of cellulose acetate with D.S. below 2.0 (excluding D.S.=0) absorb water very rapidly. However, the polymer is so hydrophilic, that at D.S. below about 1.5 liquids diffuse into the fibrils causing them to swell and become joined to each other. On drying, these fibrils do not reacquire their initial configuration. As D.S. is decreased further, the swelling phenomena, or instability on exposure to water, increases, and the dried yarns become harsher and denser. Between a D.S. of 1.5 to about 2.0, for example at 1.8, a sample may be subjected to initial wetting and three consecutive water-absorption determinations may be made as described below without significant changes in the sample, but after being placed in boiling water, the yarn consolidates to a point where it is frequently no longer windable. At D.S. below about 1.5, it is impossible to make three consecutive reproducible determinations of the water absorption rate by the procedure described below, due to the instability of the polymer in water. With regenerated cellulose (i.e., with a D.S. of zero) the absorption rates are high but swelling is suppressed, indicating that the polymer is stable in water and that plexifilaments made therefrom are useful in textile applications. Plexifilaments of high D.S. (i.e., of D.S. greater than about 2.6) as shown in FIG. 1, do not absorb water as rapidly as cotton and therefore would not be generally suitable in textile applications requiring stable, strongly hydrophilic characteristics, such as in towels.

DETERMINATION OF DEGREE OF SUBSTITUTION

The products of this invention are made of regenerated cellulose or cellulose acetate having a degree of substitution (D.S.) of between about 2.0 and 2.6. The method of measuring the D.S. of the cellulose acetate polymer is as follows:

The polymer to be analyzed is finely ground in a laboratory "Wiley Mill" equipped with a 40-mesh ($\approx$.360 mm. (openings) screen. It is placed in a vacuum oven, preheated for 10 minutes at 100°–105°C. under 5 inches ($\approx$12.5 cm.) vacuum then dried at 25–28 inches (63–71 cm.) vacuum at the same temperature for 1 hour.

Saponification is conducted in 250 cc. Erlenmeyer flasks into which are placed a magnetic stirring bar, 10 cc. methanol, 25 cc. water and 50 cc. standardized 1.0 N sodium hydroxide. A 3.2±0.1 gram sample (weighed to nearest 0.0001 gm.) of the polymer sample is sifted slowly into the flask while the contents are vigorously stirred to avoid caking. A small amount of methanol/-water solution (10/25 by volume) is used to complete the transfer. Stirring is continued for 3 hours; 6–8 drops of m-cresol purple indicator (0.1 percent solution) is added and the excess alkali titrated with standardized 0.5 N hydrochloric acid with continued vigorous stirring to assure extraction of alkali from the polymer particles. The end-point is a pale yellow color. Results are calculated as follows:

Percent combined acetic acid $$= \frac{[(cc\ NaOH \times N) - (cc\ HCl \times N)] \times F}{\text{weight of dry sample}}$$

wherein $F$ is a factor which converts milliequivalents of acetic acid to grams of acetic acid (6.000) and compensates for the average deficiency in quantitative hydrolysis inherent in the abbreviated procedure. The latter correction is obtained by calibrating the procedure on a sample of polymer known, from more rigorous hydrolysis methods to contain a given acetic acid content. A typical value for $F$ is 6.005.

DETERMINATION OF WATER-ABSORPTION RATES

To measure water-absorption rates, the procedure described generally by E. M. Buras, Jr., et al., "Measurement and Theory of Absorbency of Cotton Fabrics", *Textile Research Journal*, Vol. 20, April, 1950, pp. 239–248, is followed.

The textile product to be tested is first washed or treated to remove any additives or contaminants, and then rinsed, wrapped on a soft gauze-covered batting, boiled in distilled water for about thirty minutes, dried in a vacuum oven at about 60°C., and finally cooled. The treated product is then wrapped around a Teflon polyetrafluoroethylene form constructed as shown in FIG. 2, by cutting a 5.7-cm.-diameter circle from a 0.16-cm. thick sheet of Teflon and cutting so that dimension 11 is 3.2 cm. and dimension 12 is 4.0 cm. The form is mounted on a yarn winder to permit rotation about axis 13. The product is fed to the form through a constant tension device which exerts a load equivalent to 0.05 gram per denier. The winder transverse pitch is adjusted so that with each turn of the winder, product is laid on the form as closely adjacent its neighbor as possible. The textile product preferably should be twistless when wound. The number of turns (Y) (i.e., the number of parallel lines of material) per layer and the number of complete layers (N) needed to wind a total of about 0.5 gram of product are recorded. A minimum of at least two layers of product is required, and in those cases where very large denier yarns are used, the 0.5-gram limit may be exceeded in order to obtain the required two-layer minimum.

The textile product on the form, prepared as described above and referred to hereinafter as a "sample pad", is placed in the absorption-rate testing apparatus shown in FIG. 3. This apparatus comprises a fritted-glass Buchner funnel 20, containing a flat, horizontal, fritted-glass plate 21 measuring 5.8 cm. in diameter by 0.55 cm. in thickness and having a resistance to flow of water of about 0.083 ml./sec./cm. water pressure. The funnel is attached through a flexible coupling tube 22 to a horizontal tube 23 having a 0.31-cm. inside diameter. When the apparatus is filled with water, tube 23 acts as a reservoir for water 24. The top of porous plate 21 is positioned 1.3 cm. above the top inside surface of the horizontal reservoir.

To carry out an absorption-rate determination, porous plate 21, lower portion of funnel 20, flexible coupling tube 22, and part of horizontal tube 23 are filled by adding water 24 through the top of plate 21, and applying suction to tube 23. All bubbles are removed from the water system. Excess water, if any, is removed from the top of plate 21. The system is thus filled with water from the meniscus in tube 23 to the top of plate 21. The sample pad 25 is then placed on top of porous plate 21 and an evenly distributed load 26 of 500 grams is placed on the pad. The amount of water absorbed by pad 25 is measured by the movement of the meniscus in tube 23 with the aid of scale 27. Absorption data are collected as a function of time, starting within about two seconds after the sample pad and weight are placed on the porous plate and finishing when less than about 0.01 ml. of water is absorbed during a 60-second period. The cumulative volume of water absorbed $q$, in ml., is plotted against time t, in seconds. The "initial absorption rate", I, in ml./sec., is readily determined from the slope of the straightline portion of the plot. As reported herein, the slope was measured for the portion of data in the range of $q/Q$ values from 0.1 to 0.5 ($Q$ being the total amount in mls. of water absorbed in the test).

To obtain an accurate value for the initial absorption rate of a test product, the results of the first run on a sample pad are discarded. Additional runs are made until the results from three consecutive runs are substantially constant. Generally, a total of four runs is sufficient. Between runs, the pads are washed and then dried at 60°C. in a vacuum oven. At least three sample pads of the same product should be tested in this manner and the measured absorption rates from each sample averaged to obtain an accurate value for the initial absorption rate for the product under test.

Tests carried out in the above-described manner with various samples of cotton show that cotton absorbs water at rates equal to or above 0.086 ml./sec. The products of this invention absorb water at a rate of at least about 0.1 ml./sec.

DETERMINATION OF FIBRIL CONCENTRATION AND SPECIFIC SURFACE

It has been found that the rate at which a textile product of this invention absorbs liquid depends on fibril concentration (F) and specific surface (S). F may be visualized as being related to the number of capillary paths available to the liquid and S may be thought of as being related to the surface available per path. These characteristics and tests used to measure them are described as follows:

FIBRIL CONCENTRATION (F)

Fibril concentration (F) is defined as the number of "ends" per $cm.^2$ of textile product cross-section and can be determined by the following formula which applies to the sample pad used for the absorption-rate test:

$$F = [(L)(Y)(n)/(t)(w)]$$

where $L$ is the number of layers of product in the sample, $Y$ is the number of turns per layer on the pad (i.e., $Y$ is defined as the number of parallel lines of product). Thus, when yarn is employed, $Y$ is the number of turns per layer and when a sheet or ribbon is used, $Y$ is the number of sheets or ribbons that lie side by side in each layer of the sample pad. Whether yarn, bundles, sheets, strands, ribbons, filaments, etc., all will be referred to hereinafter as yarn. The number of fibrils per cross-section of the yarn is $n$; the total thickness in cm. of the material while under load in the Buchner funnel of the absorption-rate apparatus (excluding the thickness of the Teflon form) is $t$; and the total width in cm. of the sample wound on the pad is $w$. The number of fibrils or ends per yarn $n$, is determined from photomicrographs of the cross-section of the opened yarn (e.g., an opened plexifilamentary strand). Four cross-sectional samples, each 5 microns thick, are taken at random from the length of the yarn and the photomicrographs of these cross-sections are prepared by standard procedures, well known in the art. Three fibril counts are made on each of the photomicrographs. The 12 counts are then averaged to obtain $n$. Care must be taken not to alter the yarn (e.g., by breaking tie points, breaking fibrils or joining fibrils) during this determination. The photomocrograph should provide a lineal magnification of about 500X. Each individual fibril appears as an independent particle on the photomicrograph. A representation of such a photomicrograph is shown in FIG. 5 where several types of fibrils are identified, as discussed further below.

To fall within the scope of this invention, F must be at least $50 \times 10^3/cm.^2$. Below this value of F, the materials are coarse and unsuited for general textile use. Values of F greater than $250 \times 10^3/cm.^2$ are preferred because these materials are finely fibrillated and are particularly useful for textile applications. In addition, it has been found that water-absorption rates increase with fibril concentration, in accordance with, it is believed, the 0.73 power of F. In general, F can range up to $1000 \times 10^3/cm.^2$ or more.

SPECIFIC SURFACE (S)

Specific surface (S) of a textile product is derived from optical measurements of the light scattering coefficient (s). High specific surface provides good covering power and promotes rapid absorption of liquid. It is known that a light scattering coefficient is a measure of the specific surface of a material (TAPPI, Vol. 42, No. 12, December, 1959, pages 986–994). Light scattering measurements are used to derive the specific surface of the textile products of this invention by the procedure described below.

A sample suitable for light reflectance measurements is prepared by winding a close-packed parallel warp of product, preferably in the form of yarns on a rectangular frame (e.g., measuring about 10 cm. × 8 cm.). A yarn winder (e.g., "Suter" yarn eveness controller) is used to hold the frame and rotate it. A light tension (e.g., at about 2 grams) is maintained on the yarn to keep it essentially straight. The guide traverse controlling the number of threads per cm. is adjusted to provide a specimen with no gaps between the elements of the parallel warp. When the sample is in the form of a sheet or fabric, winding on a frame is not necessary; the flat planar sample may be used directly.

A Bausch and Lomb Opacimeter is adjusted to read absolute reflectance by calibration with a standard having an absolute reflectance of about 75 percent. Absolute reflectance is measured at ten points on the sample with the sample backed by a white body; then ten more are made with the sample backed with a black body. The sample is placed over the opening of the instrument so that the yarns run parallel to a line defined by the 5 and 11 o'clock positions (if it is assumed that the opening is a clock facing the operator). The ten readings are averaged to give, in each case, $R_o$ = absolute reflectance with black backing $R$ = absolute reflectance with white backing The rectangular area covered by the sample is measured. The sample is then removed from the wire frame and weighed. The basis weight M in $g./m.^2$ is calculated.

The formulas given by B. D. Judd "Color In Business, Science and Industry," John Wiley & Sons, Inc., 1961, pp. 322, 323 (namely, equations 48 and 55) are used to determine the scattering power K. The scattering coefficient s is then determined from the equation:

$$s = K/M$$

To convert this scattering coefficient into optical specific surface area, the following equation is used:

$$S = S/C_o N^2$$

where $C_o$ is an instrument calibration constant and $N^2$ is the fiber surface reflectivity. The calibration constant can be determined by measuring $s$ for a variety of yarns of known specific surface (e.g., smooth round fibers). This calibration constant should not differ much from unity; in the measurements given here it generally is about 0.9. Fiber surface reflectivity $N^2$ is calculated by the expression $$N^2 = [\bar{n} - 1/\bar{n} + 1]^2$$

where $\bar{n}$ is the mean index of refraction of the fiber. If the fiber is birefringent and has two values for the index ($n_\parallel$ for parallel and $n_\perp$ for perpendicular), then $$\bar{n} = (n_\parallel + 2n_\perp /3)$$

It should be recognized from the above discussion that some textile materials could have large specific surface S principally due to extraneous effects, e.g., the presence of numerous closed-cell internal voids or pigments. Although such materials might have the same specific surface values as the products without closed-cell internal voids, they would not possess the same water-absorption characteristics. For example, closed-cell voids would not generally be available to water and would not contribute to water absorption even though they contribute to light scattering.

To distinguish these products having closed-cell internal voids from products without such voids, the scattering coefficient may be measured on a wet specimen. Because water or any common liquid has an index of refraction closer to that of the polymer than does air, the surface reflectivity wet is less than when dry and the scattering coefficient correspondingly lower. In the ideal case where all of the available surface is wetted by water, the wet and dry scattering would be proportional to the wet and dry reflectivity. However, in the test procedure summarized below, the sample is not immersed when it is tested. It is only wetted. The sample is (1) soaked for 5 to 10 minutes in a water bath, (2) removed from the bath, (3) has one edge brought briefly into contact with a paper towel to eliminate excess liquid, and (4) then has its scattering coefficient determined as above. Under these test conditions, it is found that the products of this invention generally have a ratio of wet-to-dry scattering coefficient of much less than 0.4.

The textile products of this invention generally have a dry specific surface (S) of at least 0.4 m.²/gm. S can range up to 6 or more, but below 0.4, the covering power of the material is less than desired. Values of specific surface in excess of 1.5 m.²/gm. are preferred because the covering power of the material is much improved with high specific surface. An accepted measure of cover is Contrast Ratio, which is defined in ASTM Standards, Method D589–65, Part 15, April 1968, p. 93 as 100 (R./R). In addition, it has been found that stable water-absorption rates increase with specific surface, in accordance with, it is believed, the 0.3 power of S.

STABILITY TO WATER

The products of this invention are stable to repeated exposure to water. The term "stable to repeated exposure to water" means that the products do not change their structural characteristics (e.g., fibril concentration, specific surface) upon such repeated exposure, and that the products remain essentially unswollen, do not become slimy upon being wetted, and upon drying do not become stiff or hard but rather remain essentially as pliable and soft as before wetting and drying. The products are durable and derive their water-absorption characteristics from their basic structure and not from an additive that may be present only temporarily or that might be affected or removed upon repeated use of solvents or detergents commonly employed in laundering and dry cleaning operations. Thus, the term "repeated" is understood as not including any initial washings of the product which may wash out or extract such additives. Such additives which may be present in the products of this invention include the usual textile additives, e.g., dyes, pigments, antioxidants, delusterants, antistatic agents, adhesion promotors, ultraviolet stabilizers, and the like.

THE PRODUCTS AND THEIR PREPARATION

The term textile products as used herein is defined as including strands, yarns, tapes, fabrics, ribbons, and the like. All these textile products are made of assemblies of fibrils of regenerated cellulose or of cellulose acetate having a degree of substitution of between about 2.0 and about 2.6.

The "fibrils" of the fibril assemblies are fine elements which tend to lie roughly parallel to the major axis of the assembly. An assembly or portion of an assembly of fibrils is shown in the schematic drawing of FIG. 4. A majority of the fibrils 30 are joined or interconnected to other fibrils to form a continuous structure. Each fibril penetrates the array of adjacent fibrils in a random fashion before terminating at a junction as indicated by points 31. The fibrils may be interconnected in a three-dimensional array. Thus, the fibrils may be thought of as an intermingled non-planar matrix of very thin or ribbon-like elements that are interconnected (joined) at various points to form a web-like three-dimensional network or plexus.

The "fibrils" come in many irregular shapes and sizes as shown in FIG. 5 which is a drawing of an enlarged cross-section of an assembly of fibrils called a plexifilamentary strand. The rather irregular, convoluted, rolled up, or folded shape of most of the fibrils provides bulk to the strand and prevents excessively close packing of fibrils, which could block passages between fibrils thereby deleteriously affecting the wicking and absorption of water.

"Film-fibrils" are the basic units from which the fibrils are built. Individual film-fibrils may have thicknesses averaging less than one or two microns, as measured with an interference microscope. The individual film-fibrils may occasionally appear as ribbons, such as the one labeled $a$ in FIG. 5. More often the film-fibrils are folded or rolled or convoluted about their axis, frequently appearing as multilayer laminates or aggregates (labeled $b$). Sometimes filmfibrils contain voids (labeled $c$). Any of these configurations, or combinations thereof, may constitute the "fibrils" defined above. It will be seen that the cross-section of the fibrils is irregular, thus lacking in symmetry and providing a rough fibril surface. It is believed that such an irregular surface promotes water absorption. Thus, the fibril may correspond to a single film-fibril but more usually corresponds to an aggregation of film-fibrils and may be one to several times as thick as the film-fibrils of which it is constituted. Thickness measurements can be made with an interference microscope by the methods discussed in *Interference Microscopy*, King, Rienitz and Schulz, translated by J. H. Dickson, published by Hilger & Watts, Ltd., 1964.

A preferred type of fibril assembly for use herein is a plexifilamentary strand. Plexifilamentary strands are a unitary or integral assembly of fibrils which because of their high degree of interconnection among fibrils form a continuous web or strand from one piece of polymer. The term "continuous" is used herein in the sense that the plexifilament is an integral structure (due to the joining) over lengths many times greater than the length of its individual fibril components (i.e., often many meters or longer). These continuous plexifilaments may, of course, be cut into staple fiber lengths (i.e., lengths suitable for conversion into yarn by established methods, usually 0.6 cm. or greater). They may also be combined, intermingled or twisted together, and the like, to obtain higher denier.

The textile products of this invention and especially the plexifilamentary strands, are prepared by flash-spinning, at elevated temperature and pressure, a uniform solution of cellulose acetate through an orifice into a region of essentially atmospheric pressure. It is preferred that essentially all the solvent vaporize upon extrusion into the lower pressure region. One preferred procedure by which the products of this invention may be prepared is as follows:

1. A chilled pressure vessel is loaded, at a temperature between 0° and −20°C., with a mixture comprising solvent and powdered cellulose acetate having a D.S. between about 2.0 and 2.6. The polymer amounts to between about 20 to 40 weight percent of the total mixture with 20 to 30 percent being the preferred range. The solvent, which amounts to between 80 and 60 weight percent of the mixture, is itself a mixture of ethyl or methyl alcohol, with ethyl alcohol being preferred, and of "Freon" 21, a Du Pont trademark for its fluorodichloromethane. "Freon" 114, a Du Pont trademark for its tetrafluorodichloroethane may also be added to the solvent mixture. The preferred weight ratio of alcohol to halogenated olefin in the solvent mixture is between about 0.3 to 0.5, although ratios as high as 3 are sometimes suitable.

2. The vessel is closed and pressurized to between 750 and 1250 pounds per square inch (psi), with about 1000 psi being preferred.

3. The contents of the vessel are stirred and heated to between 170° and 210°C., with about 180°C. being preferred. A uniform solution is obtained.

4. The solution is extruded through an orifice between 0.4 to 0.7 mm. in diameter into a region of atmospheric pressure, where essentially all the solvent flashes and a continuous plexifilamentary strand is formed. When plexifilaments of regenerated cellulose are desired, the plexifilamentary yarn, produced as described above, may be collected on a bobbin and saponified by methods well known in the art and illustrated in Example I below.

EXAMPLES

In all examples, the yarns obtained are characterized in accordance with the procedures described above without any additives, finishes or contaminants on the yarns. Measured characteristics and some process conditions for all samples are given in Table I. The water-absorption rates of the samples are summarized in FIG. 1. Also, in the succeeding examples, L is the length and D is the diameter of a circular orifice.

EXAMPLE I

In this example, textile products of this invention are prepared in the form of plexifilaments of regenerated cellulose.

A 3.79-liter autoclave is used in this preparation. The autoclave has a motor-driven anchor-shaped stirrer and a bottom-discharge, quick-opening valve. The valve is connected to a spinneret measuring 0.46 mm L by 0.46 mm D. The equipment is chilled with a mixture of "Dry Ice" and dichloromethane and then rinsed quickly with chilled anhydrous ethanol. During preparation of this equipment and while handling the spinning charge (to be described), condensation of atmospheric moisture and frost formation are prevented by keeping the equipment and materials covered essentially at all times. Five hundred grams of cellulose acetate (Plastacele, a registered trademark of E. I. du Pont de Nemours and Company for a stabilized, molding-grade powder of cellulose acetate having a degree of substitution of 2.45) is pre-dried at 110°C. in a vacuum oven, chilled to −18°C., charged into the cold autoclave and along with a chilled mixture containing 600 ml. of anhydrous ethanol, 700 ml. of Freon 21 and 300 ml. of Freon 114. The autoclave is then sealed and pressurized with nitrogen, first to about 34 atmospheres and then gradually increased to about 68 atmospheres as the temperature of the autoclave rises to 180°C. with the stirrer turning slowly. The valve is then opened and the solution extruded to form a continuous plexifilamentary yarn which is collected in a perforated metal drum open to the atmosphere. The residual ethanol evaporates from the yarn.

A portion of the produced yarn is wound in a thin layer onto a bobbin. The acetyl groups of the cellulose acetate are saponified by immersing the yarn on the bobbin in a solution containing 1 percent sodium hydroxide and 3 percent sodium acetate at 60°C. for two hours. The bobbin of yarn is then soaked for 1 hour in very dilute acetic acid, followed by 1.5 hrs. in running water, and then for 1.5 hours in acetone. It is then dried in a vacuum oven at 50°C. in a stream of nitrogen.

As shown in Table I, the yarn exhibits stability on repeated exposure to water, has a high water absorption rate and possesses the fibril concentration and specific surface characteristics of the products of this invention. Note, however, that the surface area of the saponified yarn is much lower than that of the other samples listed in Table I. This is believed to be a result of the collapse of internal voids during aqueous saponification, since the material passes through a highly water-sensitive stage during hydrolysis. This can be avoided by removing the acetyl groups by ester exchange in anhydrous methanol, using a small amount of sodium methylate as catalyst as suggested by F. B. Cramer et al., in Industrial and Engineering Chemistry, Analytical Edition, 15, 319–320 (1943).

EXAMPLE II

A mixture of 5 grams of cellulose acetate of D.S. 1.17 and 8 ml of methanol is kept for about one-half hour at room temperature, then cooled in Dry Ice and diluted with 2 ml of Freon 21. The mixture is loaded into a chilled cylindrical pressure vessel about 15 cm. in length and 2 cm in inside diameter. The vessel is fitted with a closed spinneret at one end and a piston at the other. Nitrogen pressure of 68 atmospheres is applied to the rear of the piston. The contents of the vessel are heated to 175°C and held at temperature for 5 minutes. Total time of heating is about 17 minutes. The orifice, which measures 0.64 mm D by 0.64 mm L, is then opened and the solution is extruded to form a plexifilamentary yarn. The yarn on exposure to water is unstable. Wetting causes the yarn to swell and subsequent drying causes it to shrink and become harsh and unsuited for textile use. The water absorption rates as indicated in Table I footnote, are also unstable.

The cellulose acetate of D.S. 1.17 for this example was prepared by partial hydrolysis of the D.S. 2.45 material, following methods well known in the art and particularly described by C. M. Malm, et al., in "Hydrolysis of Cellulose Esters", Industrial and Engineering Chemistry, Process Designed Development Edition, 5(1), 81–87 (1966). In subsequent examples, the same procedure is used, as necessary to obtain cellulose acetates having different degrees of substitution.

EXAMPLE III

A mixture if prepared containing 4.60 g. of cellulose acetate having a D.S. 1.37, 10 ml. anhydrous ethanol and 2 ml. of Freon 21 and chilled to 0°C. This is processed as in Example II, except that the 5 minute hold and final extrusion are made at 200°C. As noted in Table I, the resultant plexifilamentary yarn, as in Example II, is unstable and unsuited for textile uses.

EXAMPLE IV

A mixture containing 5 grams of cellulose acetate of D.S. 1.82, 7 ml. of methanol, 2 ml. of Freon 21 and 1 ml. of Freon 114 are chilled to 0°C. The mixture is processed as in Example III except that the spinneret hole is 0.46 mm. L by 0.46 mm D with a short 30° flare and a cylindrical portion about 2.4 mm L by 2.4 mm D immediately downstream of the orifice. The resultant plexifilamentary yarn is listed as Sample A of Example IV in Table I.

Another mixture is prepared containing 5 grams of cellulose acetate of D.S. 1.82, 4.5 ml. of anhydrous ethanol and 3 ml. of Freon 21. This mixture is processed exactly as Sample A and the resultant plexifilamentary yarn is listed as Sample B of Example IV in Table I. Although both samples exhibit sufficiently stable water-absorption rates to give three consecutive, essentially reproducible determinations, some swelling on wetting is noted and on subsequent drying, some shrinkage and harshening of the yarn occurs. Thus, the yarns are rated as unstable.

EXAMPLE V

A mixture is prepared containing 5 grams of cellulose acetate of D.S. 2.45, 5 ml. of anhydrous ethanol, 5 ml. of Freon 21 and 2 ml. of Freon 114. The mixture is processed as in Example IV, Sample A, except that the hold and extrusion temperatures are 182°C. The resultant plexifilamentary yarn is listed in Table I as Sample A of Example V. A second mixture is prepared containing 5 grams of cellulose acetate of D.S. 2.45, 4.5 ml. of anhydrous ethanol, 5.5 ml. Freon 21 and 2 ml. of Freon 114. The mixture is processed in the same manner as for Sample A except that the hold and extrusion temperatures are 181°C. The resultant plexifilamentary yarn is designated as Sample B of Example V in Table I. Both yarns of this example have all the structural characteristics and advantageous properties of the textile products of this invention.

EXAMPLE VI

A mixture is prepared containing 5 g. of cellulose acetate of D.S. 2.73 (cellulose triacetate purchased from Distillation Products Industries, a division of the Eastman Kodak company) ground to pass a 20-mesh screen, 5 ml. of anhydrous ethanol and 5 ml. of Freon 21. The mixture is processed in the same manner as Sample A of Example V except that the hold and extrusion temperatures are 210°C. The resultant plexifilamentary yarn is listed as Sample A of Example VI in Table I. A second sample of plexifilamentary yarn of D.S. 2.73 cellulose acetate (Sample B) is prepared as follows: A mixture of 5 ml of anhydrous ethanol and 5 ml of Freon 21 is poured into the chilled pressure vessel of Example II. Then, 7.13 grams of the cellulose triacetate, ground to pass a 40-mesh screen, are added. This mixture is then processed in the same manner as Sample A of this example, except that the hold and extrusion temperatures are 200°C. Although the plexifilamentary yarns of triacetate prepared in this example are fully stable, they have relatively low water-absorption rates and are therefore not considered suitable for the textile uses intended for the products of this invention.

TABLE I.—CHARACTERISTICS OF CELLULOSIC PLEXIFILAMENTARY PRODUCTS

| Example Number | Sample Number | Extrusion [a] | | Product characteristics [b] | | | | | | | |
|---|---|---|---|---|---|---|---|---|---|---|---|
| | | P | T | D.S. | Denier | Density | S | F/10³ | I [c] | Stability |
| I | | 1,000 | 180 | 0 | 141 | 0.20 | 0.4 | 97 | 0.39 | Stable. |
| II | | 1,000 | 175 | 1.17 | [d] | | | 26 | 0.40 | Unstable, shrinks and becomes harsh. |
| III | | 1,000 | 200 | 1.37 | | | | 17 | 0.34 | |
| IV | A | 1,000 | 200 | 1.82 | 108 | 0.16 | 3.1 | 215 | 0.12 | Unstable; slight shrinkage and harshening. |
| IV | B | 1,000 | 200 | 1.82 | 131 | 0.23 | 5.7 | 316 | 0.20 | |
| V | A | 1,000 | 182 | 2.45 | 135 | 0.13 | 1.8 | 304 | 0.16 | Stable. |
| V | B | 1,000 | 181 | 2.45 | 115 | 0.15 | 3.0 | 945 | 0.24 | Do. |
| VI | A | 1,000 | 210 | 2.73 | 478 | 0.18 | 2.6 | 91 | 0.03 | Stable, but low absorption rate. |
| VI | B | 1,000 | 200 | 2.73 | 495 | 0.10 | 2.4 | 100 | 0.03 | |

[a] Extrusion conditions are just upstream of the extrusion orifice or spinneret; P is pressure in pounds per square inch and T is temperature in degrees centigrade, 1,000 p.s.i.=68 atms.
[b] Product characteristics are all determined by the procedures of this application except as indicated for I—D.S.=degree of substitution; Denier= total denier of the as-extruded product; Density (reciprocal of bulk) is based on the weight, width, length and thickness of the sample used in the absorption rate test while the pad is under the 500-gram load. The density is in g./cm.³; S=specific surface in M.²/gm.; F=fibril concentration per cm.²; I=water absorption rate in ml./sec.
[c] Absorption rates are based on three to five runs on each of several pads except for Examples II and III; the yarns of Examples II and III are unstable on exposure to water, and the results given are averages of only two, non-reproducible runs.
[d] Indicates that no measurement was made of this item.

UTILITY

The textile products of this invention are intended for a wide range of textile uses. Because of their extraordinary ability to absorb large quantities of water rapidly, many can serve in end uses which have heretofore been served primarily by cotton yarns. As shown in FIG. 1, in many instances, spun cotton yarns may be inferior in water absorption characteristics to the preferred plexifilamentary strands of this invention. In addition, cotton requires high amounts of twist to form a continuous load-bearing structure, while the preferred plexifilamentary strands are a continuous network as formed and require little or no twist. High amounts of twist reduce the absorption rate of yarns. However, the strands may be twisted or may be cut into staple lengths and spun into yarns as is cotton or may be converted into nonwoven materials. The resultant products still provide acceptable water absorption rates along with satisfactory cover and bulk. Among the specific uses for which the plexifilamentary yarns of this invention are particularly suited are terry-cloth towels and apparel.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A textile product comprising an assembly of fibrils, said assembly being of at least staple fiber length; said fibrils being of irregular cross-section and being composed of regenerated cellulose or cellulose acetate having a degree of substitution of between about 2.0 and about 2.6, with a majority of the fibrils being interconnected at various points to form a plexus; said product being stable to repeated exposure to water, and having a specific surface of at least about 0.4 sq. meter/gm. and a fibril concentration of at least about 50 × 10³ per square centimeter.

2. The textile product of claim 1 wherein said product is a yarn.

3. The textile product of claim 1 wherein said product is a fabric.

4. The textile product of claim 1 wherein said product is a continuous plexifilamentary strand.

5. The textile product of claim 1 wherein said fibrils are composed of regenerated cellulose.

6. The textile product of claim 1 wherein said fibrils are composed of cellulose acetate having a degree of substitution of between about 2.0 and about 2.6.

\* \* \* \* \*